Aug. 22, 1944.                H. HERRMANN                2,356,588
                          DRY RECTIFIER DEVICE
                          Filed July 5, 1941
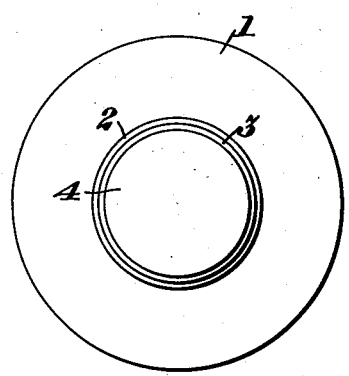
INVENTOR.
HEINRICH HERRMANN
ATTORNEY

UNITED STATES PATENT OFFICE 2,356,588

DRY RECTIFIER DEVICE

Heinrich Herrmann, Nuremberg, Germany; vested in the Alien Property Custodian

Application July 5, 1941, Serial No. 401,131
In Germany July 5, 1940

6 Claims. (Cl. 175—366)

The present invention relates to dry rectifier cells and similar rectifying means, and more particularly to rectifier devices in which the material of the base plate or electrode is preferably selected from the group of the light metals.

It is well known in the rectifier art, and in the first instance in connection with selenium rectifier cells, to use as the constituent of the base plate or electrode either a metal selected from the iron group, or to produce this base plate from another metal and subsequently to cover this plate with a layer of nickel or any other metal selected from the iron group. These last named metals are particularly advantageous since they generally do not form any chemical compounds with the selenium subsequently applied thereon as the semi-conductor layer of the rectifier cell, and if such compound would be formed, it occurs as a highly conductive selenide offering a very minute ohmic resistance in the current transfer direction so that the ohmic losses may be reduced to an extremely low value.

In the manufacturing process of the heretofore known dry rectifier cells, the above-mentioned layer of nickel was applied to the base plate or electrode either by plating or by electrolytic precipitation. In order to provide for an adequate adherence between the nickel coating of the base plate and the selenium layer to be applied thereon, this coating must be roughened, and this roughening process is generally accomplished by means of a sand blasting apparatus. However, in the manufacturing process heretofore known, this roughening has always required an additional step of operation and consequently increased expenditure and, moreover, it does not allow the base plate of being only partially covered with nickel, which by several reasons might frequently be highly desirable.

In accordance with one object of this invention there is proposed a new and useful method of manufacturing dry rectifier cells in a correspondingly simplified process which permits the application of the nickel layer on the base plate and the roughening of the base plate and the nickel coating, respectively, which roughening is inevitably necessary in order to provide proper adherence of the overlaying selenium on this nickel plating, to be carried out in one single operational step.

It is a further object of this invention to provide a base plate of a dry rectifier cell which can be only partially covered with a nickel layer, while the uncovered portion thereof may be used for other purposes, say as a cooling vane, in order to maintain the operating temperature of such rectifier devices at a proper value.

The main object of this invention is accomplished by spraying the nickel onto the base plate or electrode, preferably by means of a Schoop spraying pistol. Thus, the molten nickel particles violently impinging on the underlaying base plate effect its roughening at the same time in which these particles build up to a continuous layer of nickel.

This and other objects of the invention will be fully understood from the following description taken in conjunction with the accompanying drawing, in which Fig. 1 shows a cross section of a rectifier cell according to the invention, while Fig. 2 shows a plan view of the same embodiment. The thicknesses of the various layers constituting the cell according to Fig. 1 are shown in a highly exaggerated scale in order to obtain a clear representation.

With reference to the Figs. 1 and 2 there is shown a base plate or electrode 1 preferably consisting of a metal selected from the group of light metals. A part of this plate, that is, its center portion, has simultaneously been roughened when molten nickel particles have been sprayed thereon preferably by means of a Schoop spraying pistol, for instance, by masking the outer region of the plate by means of a stencil or the like which exposes the inner region of the plate. On this rough top surface of the nickel coating 2 an active selenium layer 3 has been applied in accordance with any method well known in the art. Finally, the selenium layer 3 has been covered with a metal alloy having a low melting point and constituting the second or counterelectrode of the rectifier cell. Now, the outer region of the base plate or electrode 1 may serve as a cooling fin which is particularly advantageous in a rectifier device of this design since the base plate together with the semi-conductor layer 3 and its intermediate coating of nickel forms a substantially integral unit by means of which the heat developed in the active part of the rectifier may be readily withdrawn therefrom and conducted to the ambient air.

The method of applying the nickel coating to the base plate by spraying as taught by this invention permits the base plate to be only partially coated by nickel in that region which actually is to be covered with selenium, while leaving the remainder of the base plate uncovered. It is thus possible when using this novel method to save a considerable amount of nickel. It is also possible according to this invention to provide a light metal base plate with a nickel coating within a short time and without the laborious preparations and other difficulties generally encountered when the nickel layer was applied by electrolytical precipitation.

The present invention is not limited to rectifier cells in which the nickel layer is applied to a base plate of light metal in a metal spraying process, since even such rectifier devices are considered to fall within the scope of this invention wherein a base plate of any conductive metal is coated by spraying thereonto a metal other than nickel, which metal is capable of constituting a proper underlaying coating for the layer of selenium to be applied thereon in a later step of the manufacturing process, or wherein the base plate consists of an insulating material having a suitable metallic coating applied thereto whereby means are associated with the said coating for establishing electrical connections therewith.

What is claimed is:

1. The method of manufacturing dry rectifier cells which comprises the following steps: preparing a base plate electrode of a material selected from the group of light metals, placing a stencil on the top surface of the base plate for masking its outer region and exposing its inner region, spraying a stream of molten metal selected from the iron group onto the exposed inner region of the base plate so that the molten metal particles impinge on the base plate violently enough to roughen the base plate while coating it to form a coating thereon substantially integral with the base plate, applying a layer of a semi-conductor on the metal-coated inner region of the base plate and covering the semi-conductor layer with a counterelectrode having a low melting point.

2. The method of making dry plate elements having a base plate, comprising the steps of spraying a stream of molten metal, selected from the iron group, on the surface of a base plate so that the molten metal particles impinge upon the base plate violently enough to roughen the base plate surface while coating it to form a coating thereon substantially integral with the base plate; and applying a layer of semi-conductor and said coating.

3. As an article of manufacture, a dry plate rectifier cell comprising, a base plate, a coating of metal from the iron group on a surface of said base plate and integral therewith, said surface and coating being of the type formed by spraying molten metal onto the surface in a manner so that the molten metal particles impinge on the base plate violently enough to roughen the base plate and become partially imbedded therein, a semi-conductor layer overlying said coating, and a counter-electrode overlying said semi-conductor layer.

4. The method according to claim 2 in which the metal selected from the iron group is nickel.

5. A dry plate cell according to claim 3 in which the metal selected from the iron group is nickel.

6. A rectifier cell according to claim 3 in which the base plate is formed from a metal selected from the group of light metals sufficiently soft for surface deformation by said metal spray impact.

HEINRICH HERRMANN.